Aug. 16, 1932. H. H. FOGWELL ET AL 1,872,133
SAFETY SPEED CONTROLLER
Filed April 6, 1929  2 Sheets-Sheet 1

INVENTORS
Harrison H. Fogwell
and Charles H. Judd,
BY
Samuel E. Fouts
ATTORNEY

INVENTORS
HARRISON H. FOGWELL
AND
CHARLES H. JUDD

ATTORNEY

Patented Aug. 16, 1932

1,872,133

UNITED STATES PATENT OFFICE

HARRISON H. FOGWELL AND CHARLES H. JUDD, OF LOS ANGELES, CALIFORNIA

SAFETY SPEED CONTROLLER

Application filed April 6, 1929. Serial No. 353,179.

This invention relates, generally, to devices for controlling the prime movers used to drive machinery, and it has for its object the provision of means for automatically stopping such prime movers in case the driven machine or machines fail to start or to attain their requisite speed. More specifically, it relates to control mechanisms for electric motors which are used for driving machinery. As shown, the motor is employed for driving the pump of an oil well. As is well-known, such wells are frequently of great depth and the motor for operating the pump is required to be of considerable power, requiring high voltage and relatively strong current. At the end of each pumping operation, the long, heavy pump-rod naturally settles to its lowermost position so that the pump, in starting, must not only lift this rod but must also lift the oil from a very great depth. It sometimes happens that the pump will fail to start under such conditions with the result that the driving connections between the motor and the pump slip, thus producing friction and generating heat which is liable to result in a disastrous fire. The invention herein disclosed is so designed and applied that the current to the motor is automatically cut off in case the pump should fail to start or to attain its proper speed so that there is a slippage in the said connections.

In our copending application, filed August 25, 1928, Serial No. 302,106, we have disclosed an electric system adapted for controlling the motors for driving oil pumps or other machines, said system comprising an electric timing device for automatically stopping and starting the motor and the pump at predetermined time intervals. While the system therein disclosed is entirely satisfactory provided the pump operates as intended, it does not provide means for stopping the motor in case the pump should fail to start or to attain and maintain its proper speed with reference to the driving motor. In disclosing our present invention, we have shown and described so much of our former invention as is necessary to make clear our present complete system and the manner in which the safety features are combined with the structures of the earlier invention.

Figure 1:
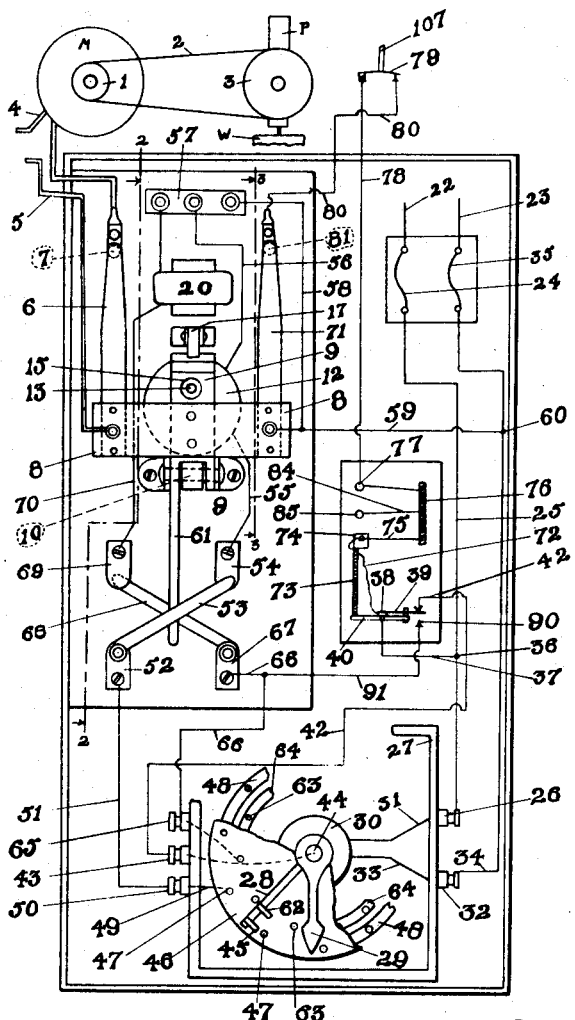
Figure 2:
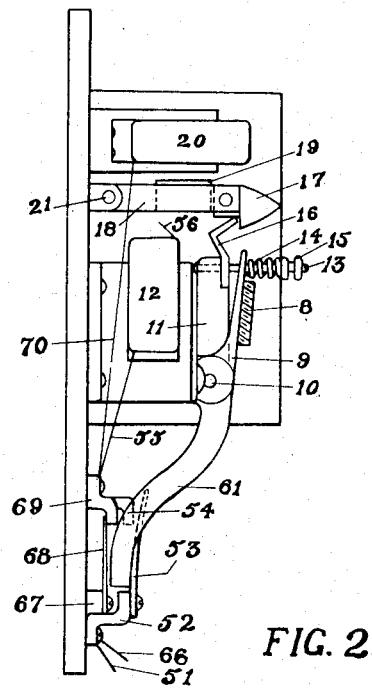
Figure 3:
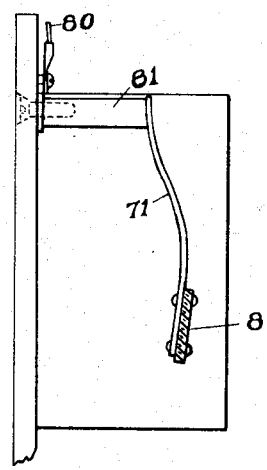
Figure 4:
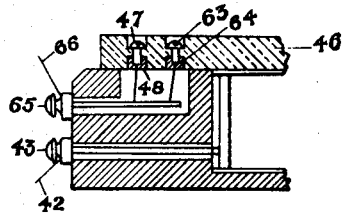
Figure 9:
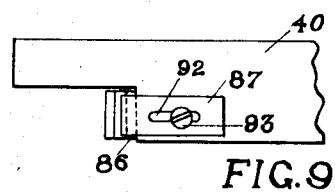
Figure 5:
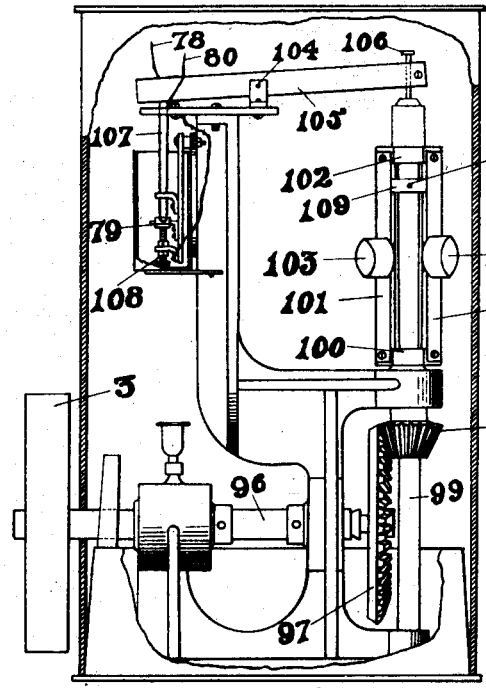
Figure 6:
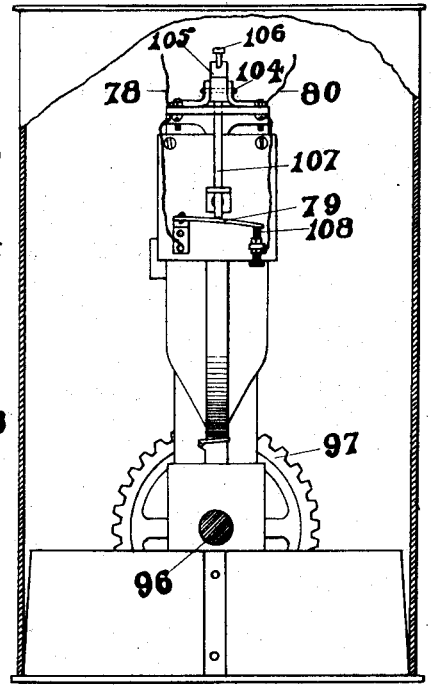
Figure 7:
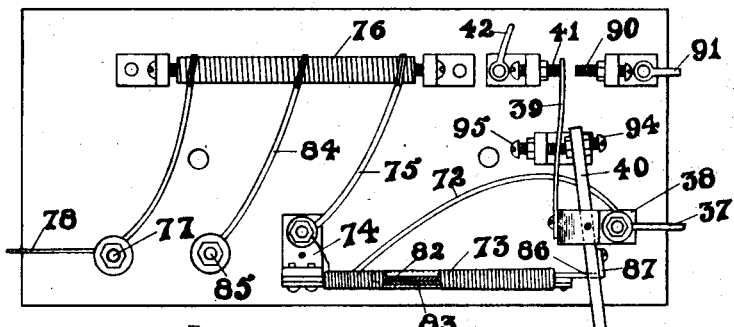
Figure 8:
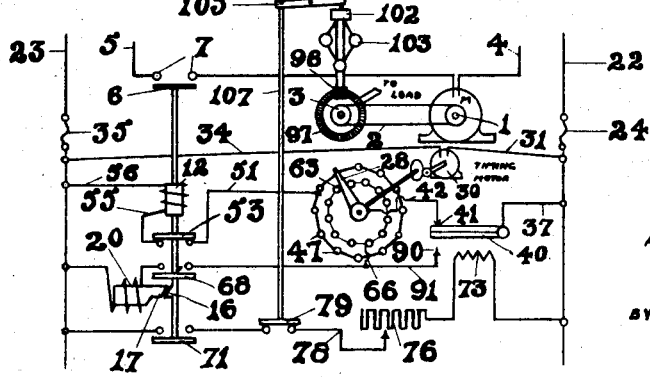

In the drawings forming a part hereof, Fig. 1 is a diagrammatic view of the electric circuits of our invention, the same showing the various automatic features which are included in the complete system and also indicating conventionally the oil pump, the driving motor and the connections between the same; Fig. 2 is a sectional view through the automatic switching mechanism for controlling the motor circuit, the same being taken on the line 2—2 of Fig. 1; Fig. 3 is a similar view on the line 3—3 of Fig. 1; Fig. 4 is a detailed view in section of a portion of the clock dial, showing certain of the electrical connections therein; Fig. 5 is a view, partly in section, showing a portion of the pump, the same including the speed governor and a switch mechanism controlled thereby; Fig. 6 is a view showing the same parts as Fig. 5 but looking from the left hand side of said figure, the driving pulley being omitted; Fig. 7 is a face view of the thermostatic control feature of the invention; Fig. 8 is a diagrammatic view of the various circuits and their controlling devices, and Fig. 9 shows a detail of the structure shown in Fig. 7.

Looking first at Fig. 1, M represents a motor, the same having a driving pulley 1 which is connected by a belt 2 to the pulley 3 of a pump P. This pump may be used for pumping oil from a well, which is indicated at W. The motor receives its current, which is of relatively high voltage, through the wires or cables 4 and 5. Within the motor circuit is a resilient spring contact member 6 which is adapted to make and break the motor circuit at the point 7. It is the purpose of the present invention to control the said contact member 6 to make and break the motor circuit at predetermined time intervals or to break the circuit in case the pump should fail to start or to attain its proper speed with reference to the speed of the motor. While the pump is shown connected to the motor through a belt and pulley, it will be understood that other forms of yieldable connections, such as a slip clutch, may be employed instead. The contact member 6 is secured to and is carried by a bar 8 of insulating material, which bar is secured to a member 9 which is pivoted upon a pin 10, the latter being stationarily mounted. Also pivoted upon the pin 10 is the armature 11 of an electro-magnet 12. The armature is provided with a pin 13 which is projected through the member 9 and is surrounded by a helical spring 14, the tension of which may be regulated by means of a nut 15 on the pin. This spring tends to move the armature toward the member 9 with more or less force, depending upon the position of the said nut. Secured to the armature 11 is a catch 16 which is adapted to be engaged and held by a hook 17 on the carrier 18 of the armature 19 of an electro-magnet 20, said carrier being pivoted on a stationary pin 21. While the electro-magnet 20 is deenergized, the hook 17 is in position to engage the catch 16 for holding the armature 11 when it is attracted by its electro-magnet 12. Fig. 2 shows the parts referred to in the position just designated. The electro-magnets 12 and 20 are included in an electric circuit of relatively low voltage and, under ordinary operation, they are energized alternately, the current through them being controlled through means now to be disclosed.

22 and 23 designate the leads of the low voltage controlling circuit; and, for clearness of description, it will be assumed that the current enters through lead 22, passes thence through a fuse 24 and through a wire 25 to a binding post 26 on the case 27 of the timing mechanism. Although this mechanism may be driven by the well-known spring motor so as to turn the hour-hand 28 and the minute-hand 29 in the usual manner, we have indicated herein an electric motor 30 for turning these hands. The said motor is, therefore, connected with the binding post 26 through a wire 31 and with a similar binding post 32 through a wire 33. From the binding post 32, a wire 34 leads to another fuse 35, and thence to the lead 23 of the low voltage circuit. Through the connections mentioned, current is passed to the clock motor 30, which is continuously driven as long as current is supplied to the low voltage circuit, and said motor, through appropriate gearing not necessary to show or describe, turns the hour and minute-hands of the clock at their appropriate rates of speed.

The controlling circuit, proper, is connected in parallel across the clock-motor circuit, the same joining at 36 to the wire 25 and passing through a wire 37 to a bracket number 38 (see Fig. 7), where it divides, one branch passing through a leaf-spring contact 39 which, under normal conditions, makes contact with a screw 41 which forms the terminal of a conductor 42, the latter leading to a binding post 43 on the case of the timing mechanism. As indicated in dotted lines in Fig. 1, this binding post is electrically connected to the arbor 44 which carries the hour-hand 28 of the timing mechanism. This hour-hand carries a contact piece 45 which is electrically connected with the hand and which sweeps about the dial 46, making contacts successively with metallic inserts 47 which are concentrically arranged near the outer perimeter of the dial. As shown in Fig. 4, these inserts are in the form of machine screws which are countersunk in the outer face of the dial below the surface thereof and which screw into a metallic ring 48 which is embedded in the inner face of the dial and which extends concentrically thereabout. The said ring is connected through a wire 49 (see Fig. 1) with a binding post 50 on the case of the timing mechanism, to which post is connected a wire 51 which leads to a stationary contact 52, to which is connected a leaf spring contact 53. Under certain conditions of operation, this spring contact closes against a stationary contact member 54, from which a wire 55 leads to the electro magnet 12, hereinbefore referred to. From this magnet the circuit extends through a connection 56 to a bus bar 57 which is, in turn, connected through a wire 58 to the other side 59 of the controlling circuit, said circuit being connected at 60 with the wire 34 leading to the outlet side of the low voltage circuit. Assuming that the spring contact 53 is closed against its contact 54, when the hour-hand carries its contact 45 into position to snap down against an insert 47, an electric circuit is established through the connections above described, with the result that the electro-magnet 12 is energized. This attracts the armature 11, drawing it to the position shown in Fig. 2 so that the hook 17 may engage the catch 16 to hold the armature in its attracted position. This movement of the armature carries with it the member 9 with its bar 8 of insulating material, which movement of the bar closes the contacts 6 and 7 of the motor circuit. The motor will thus be started to drive the pump; and this driving action will continue until the circuit is broken by releasing the catch 16 from the hook 17, thus permitting the bar 8 and its carrying member 9 to swing away from the electro-magnet 12.

As the armature 11 and the bar 8 are moved toward the electro-magnet, a tail 61, which depends from the member 9 and extends beneath the spring leaf contact 53, presses the latter out of engagement with its contact 54, thus breaking the controlling circuit through the electro-magnet 12. By reason of the engagement of the hook 17 with the catch 16, the parts are held against backward movement notwithstanding the deenergization of the magnet 12.

The hour-hand 28 carries another spring contact 62 in position to sweep over another row of inserts 63 in the dial 46, these latter inserts being also in the form of machine screws which are countersunk in the outer face of the dial and which are connected with a contact ring 64 in the inner face of the dial. As indicated by dotted line in Fig. 1, this ring is connected with a binding post 65 on the case of the timing mechanism, which post is connected through a wire 66 to a stationary member 67 to which is connected another leaf spring contact 68. Under certain conditions of operation, this spring leaf contact closes against a stationary contact member 69 which is connected, through a wire 70, with the electro-magnet 20, previously referred to. This latter magnet is connected with the bus bar 57, which is electrically connected, through the conductors 58 and 59, with the side 34 of the low voltage circuit. As will be seen from Fig. 2, the tail 61 of the member 9 extends between the spring leaf contacts 53 and 68 so as to control their positions with respect to the stationary contacts 54 and 69. While the catch 16 is engaged by the hook 17, the contact 53 is pressed away from its contact 54, and the contact 68 is allowed to close against its contact 69. When, however, the hook 17 is lifted and the catch 16 is released, the tail 61 moves to the left, as shown in Fig. 2, thus pressing the spring leaf contact 68 away from its contact 69 breaking the circuit through releasing magnet 20, and allowing the spring leaf 53 to close against its contact 54. It will thus be seen that, when the contact 62 on the hour-hand closes with any of the inserts 63 of the dial, a circuit is established through the magnet 20, thus to lift the armature 19 and its carrier 18 and to unlatch the hook 17 from its catch 16.

For a purpose hereinafter set forth, the bar 8 of insulating material carries a spring leaf contact 71, the same being shown in edge elevation in Fig. 3. This contact is similar to the contact 6 in the motor circuit and these two contacts operate together. When they are moved to close their respective circuits, the contacts are placed under stress. At the same time, the spring contact 53 is likewise placed under stress by the tail 61 of the member 9. All these contacts tend, therefore, to move the bar 8 backwardly or to the right as shown in Fig. 2. Consequently, as soon as the hook 17 is lifted, these contacts force the said bar backwardly, thus breaking the circuits through the contacts 6 and 71.

For the purpose of stopping the motor M in case the machine which it is driving fails to start or to attain or maintain its proper speed, we have provided another circuit to which we will refer as the governor circuit. This circuit leads off from the bracket 38 through a wire 72 which is coiled about a thermostat, shown generally at 73. This wire is connected to a stationary bracket member 74, to which is also connected one end of the metallic elements of the thermostat. From this bracket the circuit proceeds through a wire 75 to a resistance coil 76, from whence it leads to a stationary binding post 77. This has connected to it a wire 78 which extends to a spring leaf contact 79 which is normally held closed against a contact forming one terminal of a wire 80 which leads to the contact piece 81 with which the contact 71 cooperates. From this description it will be understood that, when the circuit through the closing magnet 12 is established and the spring leaf contacts 6 and 71 are closed against their respective contacts 7 and 81, a circuit is established through the thermostat 73 and the resistance coil 76, which circuit also includes the spring leaf contact 79 and the conductor 80. If the current through this circuit is permitted to flow for a sufficient length of time, the thermostat will be heated and distorted with the result of breaking the circuit at the screw 41 and, by closing the contacts at the screw 90, establishing a circuit through the releasing magnet 20, thus to separate the contacts 3 and 7 to break the motor circuit. The specific arrangement of the parts directly associated with the thermostat is shown in Fig. 7, to which attention is now directed.

The thermostat consists of a pair of metallic strips 82 and 83 which are securely joined together and which have different coefficients of thermal expansion. These strips are rigidly attached to the bracket 74, with the strip having the higher coefficient of expansion occupying the upper position. The wire 72 is coiled about these strips so as to heat the same as the current passes through it. The strength of this current may be regulated by the resistance coil 76. As shown in Fig. 1, the current is passing through the entire length of this coil so as to produce the maximum resistance and the minimum current. Tap wires may be led off from the resistance coil at various points to binding posts, to any one of which the wire 78 may be attached. Thus, in Fig. 7, such a tap wire is shown at 84, the same leading to a binding post 85. By attaching the wire 78 to the latter binding post, the resistance of the coil to the left of the tap wire will be cut out, a stronger current will flow and the thermostat will more quickly respond. By joining the wire 78 directly to the bracket 74, the resistance coil is cut entirely out of the circuit and the maximum current is secured. This will cause the thermostat to act still more quickly.

The free end of the thermostat carries a finger 86 which is adapted to engage a detent plate 87 on a member 40, which is pivoted at 87 to the bracket 38. Attached to this bracket is the spring leaf contact 39 which is adapted to close against the contact pin 41, thus to establish the circuit leading to the arbor of the hour-hand of the timing mechanism, as previously described. The spring contact is forced and held against the said pin 41 by the member 40 when the thermostat is in its normal condition, being so held, as shown in Fig. 7, by the engagement of the finger 86 with the detent plate 87. When, however, the thermostat is distorted downwardly, the detent plate is released, the spring contact 39 leaves the contact 41 and establishes contact at 90 with the terminal of a wire 91 which leads to and is connected with the wire 66 of the circuit of the releasing magnet 20. As shown in Fig. 9, the detent plate 87 is provided with an elongated slot 92 through which the attaching screw 93 extends, thus to provide for adjustment of the detent plate on its carrying member 40. By this means, the thermostat may be caused to release the detent plate after a greater or lesser degree of distortion. The contacts 41 and 90 are in the form of screws which may be adjusted back and forth and held in any position by lock nuts as shown, thus to regulate the space between said contacts. The spring contact 39 is moved against its contact 41 by the engagement therewith of a screw 94 which is adjustable back and forth in the member 40. Further, the said spring contact is forced backwardly against an adjustable screw 95 which is mounted opposite the screw 94. By the adjustment of these various screws, any desired position of the spring contact 39 may be secured.

The means for controlling the governor circuit through the spring contact 79, shown at the top of Fig. 1, will now be described.

In Fig. 5, the pulley 3 for the pump is shown; but, for clearness of illustration, this pulley is omitted from Fig. 6. The pulley is secured to the rotatable shaft 96, to which shaft the mechanism for moving the plunger of the pump P is connected. It is not deemed necessary to show this mechanism, since it may be of any suitable character. To the shaft 96 there is secured a beveled gear 97 which meshes with and drives a pinion 98 on the governor shaft 99. Rotatable with this shaft is a spider 100, to which is secured the lower ends of a series of resilient blades 101, the upper ends of which are attached to a spider 102 which rotates with but is slidable upon the shaft. At or near its longitudinal center, each blade carries a weight 103. As the shaft rotates, these weights fly outwardly in an obvious manner and, in so doing, draw down the spider 102.

Pivoted at 104 and extending over the spider 102 is a lever 105, the same having an adjustable screw 106 near one end which bears upon the hub of the spider. The opposite end of the lever extends above and in position to engage the upper end of a plunger 107, the lower end of which rests upon the spring contact 79, the plunger being suitably guided. When the pump is idle, the resilient blades 101 occupy the positions shown in Fig. 5 with the spider 102 in its uppermost position. When in this position, the lever 105 depresses the plunger and forces the spring contact into engagement with an adjustable contact screw 108, which screw is electrically connected with the conductor 80. The spring contact is so formed as to be considerably distorted when in the position shown in Fig. 6, and the plunger 107 may be permitted to rise an appreciable distance before the circuit is broken at the screw 108. Consequently, the pump may attain some speed before the circuit is broken. However, said circuit is broken when the pump has attained a desired speed, with the result that the current through the thermostat is cut off and the latter will continue to hold the spring contact 39 against its contact screw 41, thus maintaining the circuit through the timing mechanism. If, however, the pump should fail to start, or if for any reason it should fail to attain a proper speed, the spring contact 79 will be held against its contact screw 108 with the result that the thermostat will be heated and distorted to such a degree as to release the detent plate 87, thus permitting the spring contact 39 to break the circuit through the timing mechanism and to establish the circuit through the releasing magnet 20, thus to break the circuit through the motor. When this happens, the entire system is out of commission until the lever 40 is reset by hand to the position of Fig. 7.

The purpose of the governor being to control the position of the lever 105, it is obvious that when the spider 102 has moved sufficiently to permit the contact 79 to break contact with its screw 108, there is no reason why the weights 103 should be permitted to fly outwardly any farther. We, therefore, provide a stop for arresting the travel of the said spider, said stop being in the form of a ring or collar 109 upon the shaft 99. This collar may be placed at any desired point upon the shaft and be secured in position by a set-screw 110. When the spider engages this collar the weights will be prevented from flying out excessively if the pump should increase its speed.

The purpose of the timing mechanism has been fully set forth in our said application and it is sufficient to state herein that it is intended to permit the pump to operate until the oil accumulated in the well is practically exhausted, then to stop the pump until the oil flows in and then to start the pump again.

Referring to the diagramatic view, Fig. 8, the high voltage motor circuit is shown at 4—5, the same having the open contacts 6 and 7. The low voltage circuit leads are designated 22 and 23, the fuses being indicated at 24 and 35. Extending in parallel arrangement across these leads are the timing motor circuit, the time-controlled circuit and the governor circuit. The timing-motor circuit is designated 31 and 34 and the timing motor, 30, the latter driving the hour-hand 28 of the timing mechanism. The circuit for this timing mechanism extends from the lead 22, through wire 37, and includes the contact point 41, conductor 42, arbor of the hour-hand 28, the hour-hand and its outer contact, the outer series of connected dial contacts 47, the wire 51, contacts bridged by the switch member 53, wire 55, magnet 12 and wire 56 which extends to the low-voltage circuit lead 23. The hour-hand with its inner contact cooperates with the inner series of connected contacts 63, and the latter are connected through wire 66, to contacts which are adapted to be closed by the switch bridge-member. From these contacts the current passes about the releasing magnet 20 and from thence to the lead 23.

The governor circuit extends from the lead 22, through the thermostat coil 73, the variable resistance 76 and the conductor 78 to the contacts at the switch member 79, the latter being under control of the governor, indicated at 102 and 103. From the switch member 79, the circuit proceeds to contacts which are adapted to be closed by a switch member 71, and thence to the lead 23.

The magnet 12, when energized, causes the switch member 6 to close the motor circuit and, simultaneously, to close the contacts which cooperate with the switch members 68 and 71 and to open the contacts at the switch member 53.

Briefly stated, the operation is as follows: The hour-hand having reached the position for closing the circuit through one of the dial contacts 47, the timing circuit is established through the electro-magnet 12 and the motor circuit is closed at the contacts 6 and 7. While the motor circuit is closed, the circuit through the electro-magnet is broken at the switch member 53; but the contacts 6 and 7 are held closed by the latch or hook 17 and the catch 16. Under normal conditions, the motor circuit remains closed until the hour-hand reaches the next contact 63, when the timing circuit is closed through the switch member 68 and the releasing magnet 20. The latter thereupon draws back the latch 17 and permits the contacts 6 and 7 to open, in which condition they remain until the hour-hand reaches the next contact 47, when the cycle just described is repeated.

If, when the motor circuit is closed at 6 and 7, the pump or other load on the motor M should cause the belt 2 or other driving connection to slip so that the governor 102 and 103 fails to attain a speed corresponding to that of the motor, the contact member 79 holds the governor circuit closed so that current flows through the thermostat coil 73 for a time sufficient to heat the thermostat and to cause it to close the circuit through the contact 90, wire 91, switch member 68 and releasing magnet 20, thus to release the catch 16 and permit the motor circuit to open at 6 and 7. At the same time that the motor circuit opens, the governor circuit is broken at the switch member 71 so that the current through the thermostat coil is cut off.

While we have shown and described what is, at present, our preferred embodiment of the invention, we realize that the details may be variously modified without departing from the principles of our invention. It will be understood, therefore, that the description given is illustrative and that the following claims are not intended to be limited any further than their specific terms make necessary.

We claim:

1. In a system for the purpose described, the combination with a machine for doing work, of an electric motor, means susceptible of slippage connecting the motor and the machine through which the latter may be driven by the motor, a power circuit including a switch through which current is supplied to the motor, a speed governor connected with the said machine, an auxiliary circuit having normally closed contacts, means whereby the said speed governor may cause said contacts to open when the machine attains the requisite speed, and means under control of the auxiliary circuit for causing the said switch to open and break the motor circuit in case of excessive slippage in the said connecting means and the machine fails to attain the speed necessary for causing said contacts to open.

2. In a system for the purpose described, the combination with a machine for doing work, of an electric motor, means susceptible of slippage connecting the motor and the machine through which the latter may be driven by the motor, a power circuit including a switch through which current is supplied to the motor, a speed governor connected with the said machine, an auxiliary circuit having normally closed contacts and a switch, means whereby the said speed governor may cause the said contacts in the auxiliary circuit to open when the machine attains the requisite speed, and means under control of the auxiliary circuit for causing the said switches to open and break their respective circuits in case of excessive slippage in the said connecting means and the machine fails to attain the speed requisite for causing the said contacts to open.

3. In a system for the purpose described, the combination with a machine for doing work, of an electric motor, means susceptible of slippage connecting the motor and the machine through which the latter may be driven by the motor, a power circuit including a switch through which current is supplied to the motor, a speed governor connected with the said machine, an auxiliary circuit having normally closed contacts and a switch, means whereby the speed governor may cause the said contacts in the auxiliary circuit to open when the machine attains a predetermined speed, a thermostat in the auxiliary circuit, and means under control of the said thermostat for causing the said switches to open their respective circuits in case of excessive slippage in the said connecting means and the machine fails to attain the speed requisite for causing the said contacts to open.

4. In a system for the purpose described, the combination with a machine for doing work, of an electric motor, means susceptible of slippage connecting the motor and the machine through which the latter may be driven by the motor, a power circuit including a switch through which current is supplied to the motor, a speed governor connected with the said machine, an auxiliary circuit having normally closed contacts and a switch, means whereby the speed governor may cause the said contacts in the auxiliary circuit to open when the machine attains a predetermined speed, a thermostat and a variable resistance in series therewith in the auxiliary circuit, and means under control of the said thermostat for causing the said switches to open their respective circuits in case of excessive slippage in the said connecting means and the said machine fails to attain the speed requisite for causing the said contacts to open.

5. In a system for the purpose described, the combination with a machine for doing work, of an electric motor, means susceptible of slippage connecting the motor and the machine through which the latter may be driven by the motor, a power circuit including a switch through which current is supplied to the motor, a speed governor connected with the machine, an auxiliary circuit having normally closed contacts and a switch, means for holding the said switches in their closed positions, means whereby the speed governor may cause the said contacts in the auxiliary circuit to open when the machine attains a predetermined speed, a thermostat in the auxiliary circuit, an electro-magnet for controlling the holding means for said switches, and means under control of the said thermostat for closing a circuit through said electro-magnet for releasing the said holding means in case of excessive slippage in the said connecting means and the machine fails to attain the speed requisite for causing the said contacts to open, the operation of the said holding means permitting the said switches to open, thus to break their respective circuits.

6. In a system for the purpose described, the combination with a machine, of an electric motor, means susceptible of slippage connecting the motor and the machine through which the latter may be driven by the motor, a power circuit including a switch through which current is supplied to the motor, a speed governor connected with the machine, an auxiliary circuit having normally closed contacts and a switch, connections between said switch and the switch in the power circuit for causing the switches to operate together, means for holding the said switches in their closed positions, means whereby the speed governor may cause the said contacts in the auxiliary circuit to open when the machine attains a predetermined speed, a thermostat and a variable resistance in series therewith in the auxiliary circuit, an eltcro-magnet for controlling the holding means and said switches, and means under control of the said thermostat for closing a circuit through said electro-magnet for releasing the said holding means in case of excessive slippage in the said connecting means and the said machine fails to attain the speed requisite for causing the said contacts to open, the operation of the said holding means permitting the said switches to open, thus to break their respective circuits.

In testimony whereof we have signed our names to this specification.

HARRISON H. FOGWELL.
CHARLES H. JUDD.